(No Model.) 3 Sheets—Sheet 2.

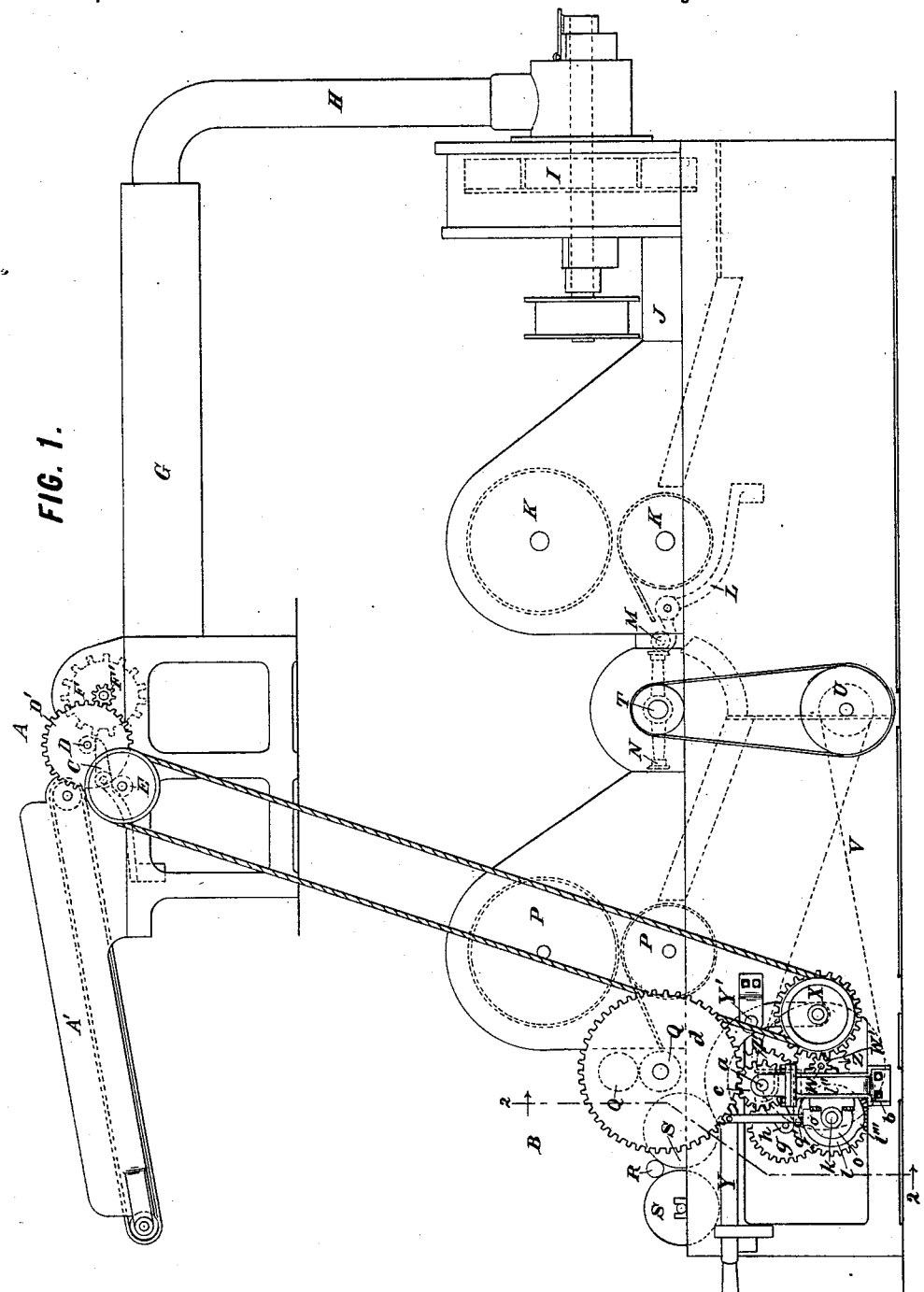

S. TWEEDALE.
MACHINE FOR OPENING AND SCUTCHING COTTON.

No. 404,133. Patented May 28, 1889.

WITNESSES:
J. A. Criswell.
C. K. Fraser.

INVENTOR:
Samuel Tweedale,
By his Attorneys,
Arthur C. Fraser & Co.

(No Model.) 3 Sheets—Sheet 3.

S. TWEEDALE.
MACHINE FOR OPENING AND SCUTCHING COTTON.

No. 404,133. Patented May 28, 1889.

WITNESSES:
J. A. C. Criswell.
C. K. Fraser.

INVENTOR:
Samuel Tweedale,
By his Attorneys,
Arthur C. Fraser & Co.

UNITED STATES PATENT OFFICE.

SAMUEL TWEEDALE, OF ACCRINGTON, COUNTY OF LANCASTER, ENGLAND.

MACHINE FOR OPENING AND SCUTCHING COTTON.

SPECIFICATION forming part of Letters Patent No. 404,133, dated May 28, 1889.

Application filed January 21, 1887. Serial No. 224,988. (No model.) Patented in England July 29, 1884, No. 10,692.

*To all whom it may concern:*

Be it known that I, SAMUEL TWEEDALE, a subject of the Queen of Great Britain, and a resident of Accrington, in the county of Lancaster, England, have invented certain new and useful Improvements in Machines for Opening and Scutching Cotton, for which I have obtained patent in Great Britain, No. 10,692, bearing date July 29, 1884, of which the following is a specification.

My invention relates to machines for opening and scutching cotton, and has for its object to remedy the defect in such machines as heretofore constructed that the machine when stopped had the whole length of the "trunk" filled with cotton, which is objectionable on restarting the machine and for other obvious reasons. To remedy the defect referred to, I employ improved driving or actuating mechanism so arranged and timed that in stopping the machine the "lap-motion" shall be continued in gear long enough after the feed-motion has been stopped to withdraw the cotton from the trunk, leaving a clear and empty trunk for the next operation of the machine. I also provide means whereby on restarting the machine the "feed-motion" will be first started, and the lap-motion will remain inoperative until the trunk is filled with cotton, whereupon it will be automatically started.

Figure 3:
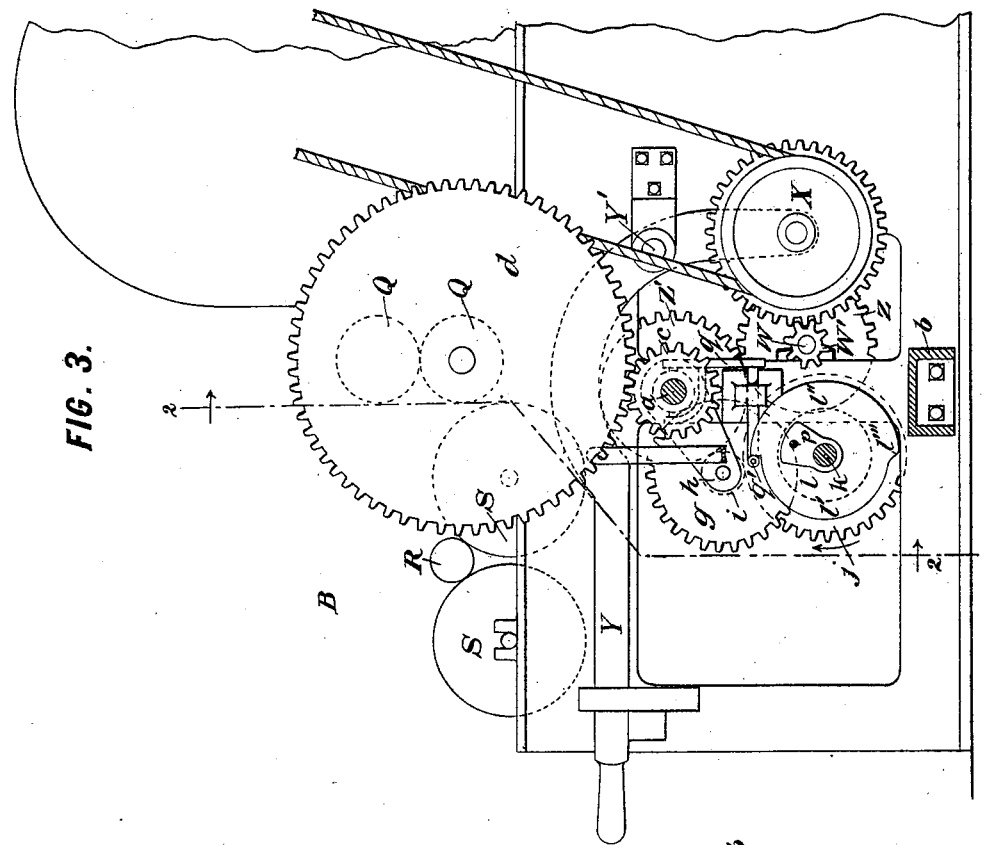
Figure 2:
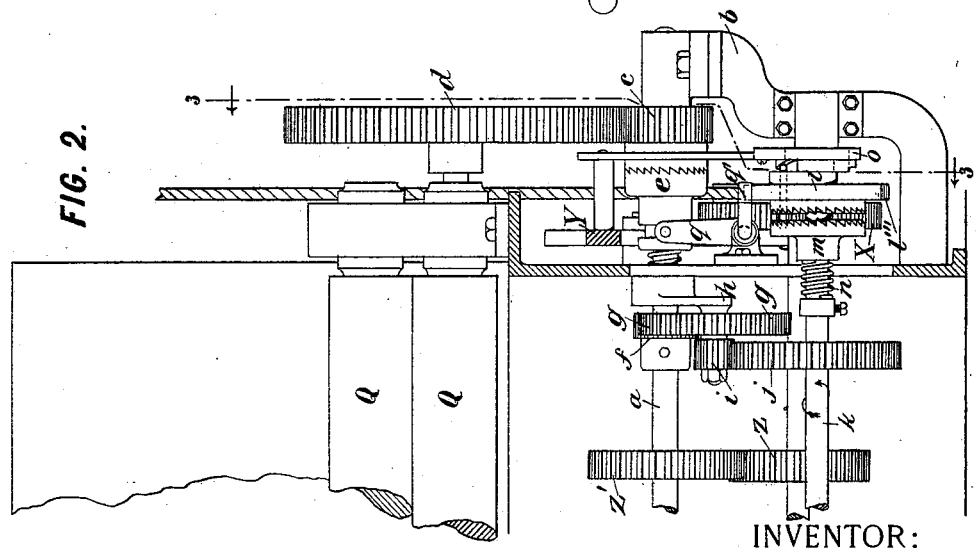
Figure 5:
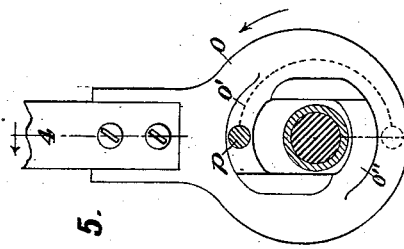
Figure 7:
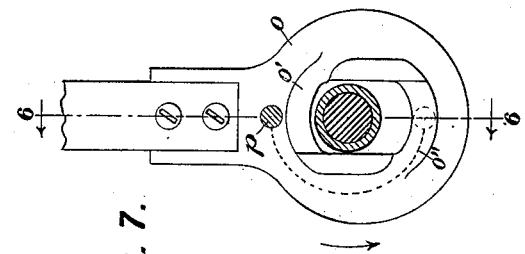
Figure 4:
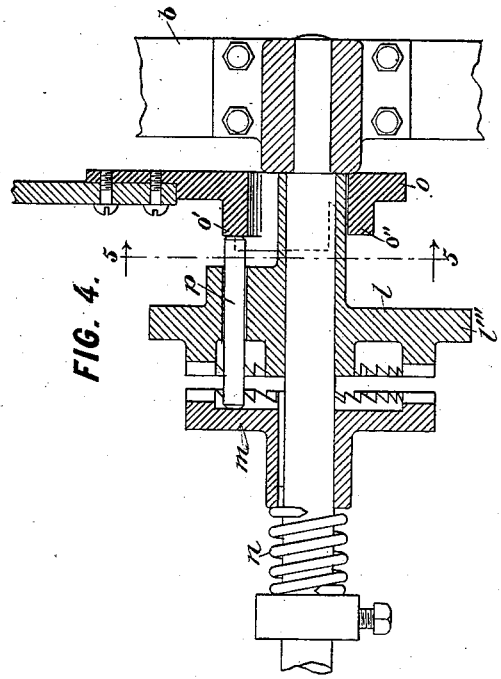
Figure 6:
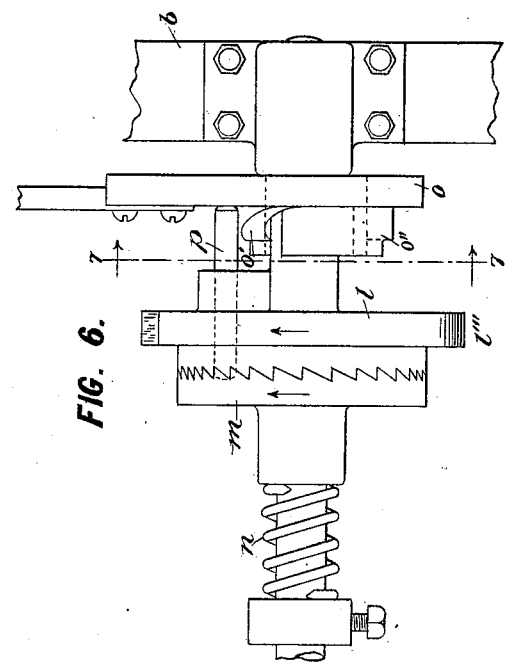

In the accompanying drawings, Figure 1 is a side elevation on a reduced scale of a machine for opening and scutching cotton having my improvements applied thereto. Fig. 2 is a fragmentary vertical transverse section on a larger scale of such a machine cut on the line 2 2 in Figs. 1 and 3. Fig. 3 is a fragmentary vertical section cut on the line 3 3 in Fig. 2, and showing part of the driving mechanism for the lap-motion. Fig. 4 is a vertical axial section showing the Parrs motion in one position. Fig. 5 is a vertical section cut on line 5 5 in Fig. 4, and showing the cam-plate of the Parrs motion in elevation; and Fig. 6 is a side elevation of the Parrs motion, showing it in another position. Fig. 7 is a similar view to Fig. 5, cut on line 7 7 in Fig. 6.

Referring particularly to Fig. 1, I will first describe the machine for opening and scutching cotton, to which I have shown my invention as applied.

This machine is similar to machines of this class now in use in its construction and operation.

Let A represent the feed-motion at the entering end of the machine, and B the lap-motion at the delivering end of the machine. The feeding end A has an endless traveling apron, A', on which the cotton is spread. This apron delivers the cotton onto the cotton-holders C directly in front of the feed-roller D. The feed-roller carries on its shaft a spur-wheel, which receives motion from a pinion secured to the feed driving-shaft E, and the spur-wheel D' on the feed-roller shaft drives the beater-shaft F' through the medium of a pinion on the end of that shaft.

The cotton is delivered between the cotton-holder C and the feed-roller D, and is batted away from these by the beater F, which throws it into the cleaning-trunk G. The cotton is carried through the cleaning-trunk G and pipe H by suction due to a fan, I, and is drawn by such fan into the second trunk J. It passes through trunk J to the dust-cages K K, which receive the cotton and drop it onto the second cotton-holders L directly in front of the second feeding-roller M. As the cotton is delivered from this roller M, it is struck by the second beaters N and thrown into the chamber O, from which chamber it passes to the second dust-cages P P. From these cages the cotton is delivered to the calender-rolls Q Q, which rolls compress it into a sheet and pass it on to be wound on the "lap-roller" R, which is driven by the supporting-rollers S S. When a sufficient quantity of the lap has been wound on the roller R, the roller is removed and a new one substituted, and the operation continues as described.

Motion is imparted to the various parts of the machine by connections from the shaft T, carrying the second beater N, which shaft has a continuous rotation.

As thus far described this machine is the same as those in use heretofore. It has been customary heretofore to drive the feed-motion A and the delivery or lap motion B by direct connections, whereby, when it was desired to stop or start the machine, the parts mentioned were stopped or started simultaneously. This had the disadvantage that it left the trunk G, pipe H, and trunks J and O and the cages full of cotton.

According to my invention I construct the machine so that in stopping the feed-motion A will be stopped first and the other motions will continue until the trunks are emptied of cotton, whereupon the lap-motion B will stop.

I will now describe the mechanism by which I accomplish this result. From a pulley on the shaft T motion is imparted, by means of a belt and pulley, to the shaft U. This shaft carries a smaller pulley on its other end, and over the smaller pulley a belt, V, is run, which imparts motion to a pulley on the transverse shaft W, as seen in Fig. 1. The shaft W, which is the driving-shaft of the feed and lap motions, is thus driven continuously. It carries on its end a pinion, W', which meshes with a spur-gear, X. A rope-belt pulley is formed on one side of the spur-gear X, and over this pulley a rope-belt is run, which takes over a similar rope-belt pulley mounted on the shaft E, carrying the driving-pinion of the "feed." Thus it will be seen that upon the rotation of driving-shaft W motion will be imparted therefrom to spur-gear X and its belt-pulley, and through the medium of the rope-belt and the belt-pulley on shaft E the feed mechanism will be driven. These parts thus constitute the feed-motion driving-gear.

The spur-gear X is pivoted to an operating-lever, Y, which lever is fulcrumed to the side of the machine on a bracket, Y', and extends out past the end of the machine, where it terminates in a handle. To throw the feed-motion out of gear, it is only necessary to depress the handle of this lever Y, thereby moving the spur-gear X out of mesh with the pinion W'. The shaft W also serves to drive the lap-motion B through the medium of a lap-motion driving-gear. A spur-gear, Z, is mounted on the shaft W and drives a spur-gear, Z', mounted on a shaft, $a$, which extends transversely of the machine, its end having bearings in a bracket, $b$. Upon the shaft $a$ is loosely mounted a spur-gear, $c$, which meshes with the gear $d$ of the lower calender-roll, Q. The spur-gear $c$ has clutch-teeth upon its hub, which engage with teeth on the face of a clutch-boss, $e$, feathered upon the shaft $a$. When the clutch $e$ is in engagement, the spur-gear $c$ is driven with the shaft $a$ and drives the calender-rolls Q through the medium of the spur-gear $d$. When the clutch $e$ is thrown out of engagement, the pinion $c$ and calender-rolls cease to revolve. The parts intervening between the driving-shaft W and the calender-rolls constitute the lap-motion driving-gear.

The lap-motion is stopped by disengaging the clutch $e$ from the pinion $c$. The disengagement of this clutch is effected as a consequence of the movement of the operating-lever Y, which disengages the feed-motion driving-gear and thereby stops the feed. This movement does not immediately disengage the clutch, but sets in operation a timing mechanism or "lost-motion device," which delays for a predetermined interval the disengagement of the clutch. Many such timing or lost-motion devices are known in the mechanic arts. I prefer to employ the one known as "Parrs change motion," which has been applied to spinning-mules, and the construction and application of which I will now describe.

On the shaft $a$ is fixed a pinion, $f$, which meshes with a spur-gear, $g$, mounted on a pivoted arm, $h$. This gear $g$ carries on its hub a change-pinion, $i$, which in turn meshes with a spur-gear, $j$, fixed on a shaft, $k$. This shaft is arranged transversely of the machine and its end has a bearing in bracket $b$, as seen in Figs. 1 and 2. The shaft $a$, through the medium of the intermediate gearing, thus drives the shaft $k$ at a reduced speed. This shaft $k$ serves to drive the Parrs change motion, which consists of a clutch-boss, $m$, feathered on the shaft, a disk-cam, $l$, loosely mounted on the shaft, a cam-plate, $o$, connected to the operating-lever Y and extending down beside the disk-cam, and a pin, $p$, (see Fig. 4,) carried by the disk-cam and playing loosely through a hole therein and intervening between the clutch $m$ and the cam-plate $o$.

The cam-plate $o$ is connected to the operating-lever Y by means of a tie-bar, and moves up and down with that lever as the latter is moved to start or stop the feed-motion. This cam-plate has an elongated hole in its center, through which the hub of the disk-cam $l$ passes, and it is formed with two oppositely-inclined throw-off cams or projections, $o'$ and $o''$, as best seen in Figs. 4 and 5. These projections $o'$ and $o''$ are so arranged that when the cam-plate $o$ is in the upper position the projection $o'$ will be in the path of rotation of the pin $p$, and the projection $o''$ will be inside of that path, and when the plate $o$ is in the lower position the projection $o''$ will be in the path traveled by the pin, and the projection $o'$ will be inside of that path. A spring, $n$, tends to force the clutch $m$ toward the disk-cam $l$. The disk-cam $l$ is adapted to engage with the clutch $m$, and is constructed with two portions or working-faces of different radii on its periphery. The smaller portion, $l'$, occupies one-half of the circumference of the cam and forms what I will call the "running-face," and the portion $l''$, which is of larger radius, occupies the remaining one-half of the circumference and forms what I will call the "resting-face." These two faces are connected by a rise, $l'''$, and diametrically opposite this rise the face $l''$ terminates in a sudden drop to the face $l'$, as seen in Fig. 3.

The function of the disk-cam $l$ is to throw the clutch $e$ into or out of engagement with the pinion $c$. This is accomplished through the medium of a forked lever, $q$, the forked end of which engages an annular groove on the hub of clutch $e$, so that as the lever is tilted it moves the clutch $e$ toward or from the pinion $c$. An arm on this lever projects forward and carries a roller, $q'$, on its end, which rides on the cam-face of the disk-cam $l$, as will be seen in Figs. 2 and 3.

When the machine is normally running, as shown in Figs. 1 to 5, the feed-motion and lap-motion being both in operation, the disk-cam $l$ is stationary, and carries the roller $q'$ on its smaller face, $l'$, the cam-plate $o$ is in its upper position, with its inclined face $o'$ directly in front of the intervening pin, $p$, carried by the disk-cam $l$, and the clutch $m$, which has a continuous rotation with the shaft $k$, is pressed back out of engagement with the disk-cam $l$ by the intervening pin, $p$. The act of depressing the operating-lever Y to stop the feed-motion also lowers the cam-plate $o$, whereby its incline $o'$ passes down from in front of the pin $p$, whereupon the spring $n$ forces the clutch $m$ forward into engagement with the cam-disk $l$, and in so doing also pushes the pin $p$ through the disk-cam until the pin extends almost to the flat face of the cam-plate $o$. Figs. 6 and 7 show the parts in this position.

The clutch $m$ upon engaging the disk-cam $l$ drives this cam in the direction of the arrow thereon, and as this cam rotates it carries around with it the pin $p$. As the disk-cam $l$ rotates, the roller $q'$ rides over its face $l'$ until the disk-cam has made half a revolution, whereupon the rise $l'''$ on the cam-face passes under the roller $q'$, and thereby raises it and throws the forked lever inward until the clutch $e$ is withdrawn from engagement with pinion $c$, thereby stopping the rotation of the calender-rollers Q. The speed of rotation of the shaft $k$ is so timed that the disk-cam $l$ completes this half-revolution, and thereby stops the "lap-motion" at the same time that the last of the cotton with which the trunks were filled is drawn out by the calender-rolls, thereby leaving the trunks empty.

During the half-revolution of the disk-cam $l$ the pin $p$, which it carries, is moved around on the surface of cam-plate $o$ in the path denoted by dotted lines in Fig. 7 until it has come in contact with the lower inclined face or projection, $o''$, on the cam-plate $o$, and it is driven up this inclined face $o''$ by the continued rotation of the cam-disk $l$. In traveling up this face the pin $p$ is pushed inward through the cam-disk $l$ and against the face of the clutch $m$ until it has forced this clutch out of contact with the teeth on disk-cam $l$, which it does just as the latter completes a half-revolution, whereupon the disk-cam stops. The disk-cam is thus stopped immediately after its enlarged face $l''$ comes under the roller of the forked lever $q$ and forces the same upward.

To start the machine, the handle-lever Y is raised, thereby starting the feed-motion and raising the cam-plate $o$. The lost-motion device is thus again set in operation in order that the lap-motion shall not start until the trunks have been filled with cotton. The raising of the cam-plate withdraws its cam-face $o''$ from in front of the sliding pin $p$, and the spring $n$, acting on clutch $m$, forces the pin $p$ through the disk-cam $l$, as before, until the end of the pin comes against the face of cam-plate $o$ and the teeth on clutch $m$ engage with those on the disk-cam $l$. Thus the disk-cam is caused to rotate with the clutch $m$, whereupon it makes a half-revolution, with its larger face, $l''$, supporting the roller $q'$, and thereby keeping the clutch $e$ out of engagement with pinion $c$. When the disk-cam $l$ has completed a half-revolution, the abrupt end of its enlarged face $l''$ passes under the roller $q'$ and the roller falls to the smaller face, $l'$, of the cam, thereby permitting the clutch $e$ to engage the pinion $c$ and drive it again. When the disk-cam $l$ reaches the position just described, the sliding pin $p$ has been carried around from the position shown in dotted lines in Fig. 5 at the bottom of the cam-plate over the path indicated by the dotted semicircle, and has been driven up the inclined face $o'$ until it is forced back through the disk-cam $l$ far enough to again disengage the clutch $m$, and thereby stop the movement of the disk-cam $l$. It will thus be seen how the feed is started and continues to operate for some time previous to the starting of the lap-motion.

The delay in stopping or starting the lap-motion relatively to the feed-motion which is caused by the lost-motion device can be varied by merely changing the size of the change-pinion $i$, and thereby altering the rotative speed of the shaft $k$.

It will be understood that my invention is susceptible of various structural modifications without departing from its essential features. For example, the cam-plate $o$ may be operated independently of the lever Y.

What I claim is, in a machine for opening or scutching cotton, or for analogous purposes, the following defined novel features and combinations, substantially as hereinbefore set forth, viz:

1. The combination, with the driving-shaft and lap-motion, of an intervening driving-gear, an operating-lever for throwing said gear into or out of action, and a lost-motion device intervening between the operating-lever and said gear for delaying the effect on said gear of a manipulation of said lever.

2. The combination, with the driving-shaft, feed-motion, and lap-motion, of gearing for driving the feed-motion, gearing for driving the lap-motion, and an operating-lever for starting or stopping said motions, connected directly to the feed-motion driving-gear for throwing it into or out of connection immediately upon the manipulation of said lever, and a lost-motion device intervening between said lever and the lap-motion driving-gear for delaying the stopping or starting thereof on a manipulation of said lever, whereby the feed-motion is started or stopped in advance of the lap-motion.

3. The combination, with the driving-shaft, the lap-motion, and gearing for driving the latter, of a clutch adapted to connect or disconnect said gearing and a cam for operating said clutch.

4. The combination, with the driving-shaft, the lap-motion, and gearing for driving the latter, of a clutch adapted to connect or disconnect said gearing, a rotary cam for driving said clutch, and an adjustable driving-gearing between said cam and the driving-shaft, whereby the speed of said cam relatively to the driving-shaft may be varied.

5. The combination, with the driving-shaft, the lap-motion, and gearing for driving the latter, of a clutch adapted to connect or disconnect said gearing, a rotary cam for driving said clutch, and another clutch adapted to engage with and drive said cam, and means for throwing said latter clutch into and out of engagement with said cam, whereby the rotation of said cam can be controlled and its action on the lap-motion driving-gear regulated.

6. The combination, with the driving-shaft, the lap-motion, and gearing for driving the latter, of a clutch adapted to connect or disconnect said gearing, a rotary cam for driving said clutch, and another clutch adapted to engage with and drive said cam, and a throw-off cam adapted to act against said latter clutch and to throw it into or out of engagement with said rotative cam.

7. The combination, with the driving-shaft, the feed-motion, and the lap-motion, of a feed-motion driving-gear for driving the feed-motion, a lap-motion driving-gear for driving the lap-motion, a clutch adapted to connect or disconnect said lap-motion driving-gear, a rotary cam for operating said clutch, another clutch adapted to engage with and drive said rotary cam, and a connection between said latter clutch and the feed-motion driving-gear, adapted to throw said latter clutch into action upon the stopping or starting of the feed-motion driving-gear, whereby the said cam is set in operation upon stopping or starting the feed-motion driving-gear.

In witness whereof I have hereunto signed my name in the presence of two subscribing witnesses.

SAMUEL TWEEDALE.

Witnesses:
JOSEPH SMALLEY,
JOSEPH GRIMSHAW.